(12) United States Patent
Gray

(10) Patent No.: US 11,407,380 B2
(45) Date of Patent: Aug. 9, 2022

(54) SEAT BELT RETRACTOR

(71) Applicant: Joyson Safety Systems Acquisition LLC, Auburn Hills, MI (US)

(72) Inventor: Mark F. Gray, Macomb, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 17/086,339

(22) Filed: Oct. 31, 2020

(65) Prior Publication Data

US 2021/0129790 A1     May 6, 2021

Related U.S. Application Data

(60) Provisional application No. 62/929,059, filed on Oct. 31, 2019.

(51) Int. Cl.
*B60R 22/46* (2006.01)

(52) U.S. Cl.
CPC .. *B60R 22/4628* (2013.01); *B60R 2022/4685* (2013.01)

(58) Field of Classification Search
CPC ............. B60R 22/46; B60R 22/4628; B60R 2022/4647; B60R 2022/4642;
(Continued)

(56) References Cited

U.S. PATENT DOCUMENTS 6,363,722 B1 * 4/2002 Takehara ............ B60R 22/4628
60/632
6,532,739 B2 * 3/2003 Kameyoshi ......... B60R 22/4628
242/374

(Continued)

FOREIGN PATENT DOCUMENTS

CN      107257754 A     10/2017
JP      2020-104815 A    7/2020
(Continued)

OTHER PUBLICATIONS

Tadayuki, Pretensioner, Retractor, and seat belt device, JP2020104815A, priority JP2018248145, Dec. 28, 2018, retrieved from Espacenet on Sep. 29, 2021. (Year: 2018).*

(Continued)

*Primary Examiner* — Paul N Dickson
*Assistant Examiner* — Caitlin Anne Miller
(74) *Attorney, Agent, or Firm* — Gordon Rees Scully Mansukhani, LLP

(57) ABSTRACT

A seatbelt retractor for a seat belt device in a vehicle. The retractor including a frame and a spool. The spool is configured to be fixed to one end of a webbing which is wound around the spool. A pretensioner device configured to rotate the spool in response to an excessive acceleration of the vehicle. The pretensioner device comprises a power transmission element carried in a pretensioner tube that is driven by a piston located in the pretensioner tube. The pretensioner device includes a gas generator for driving the piston into the power transmission element. The pretensioner device includes a seal system that includes a stopper tube located in a downstream end of the pretensioner tube to create a stop location for the piston to prevent operating gas from exiting the end of the pretensioner tube.

9 Claims, 19 Drawing Sheets

(58) Field of Classification Search
CPC .......... B60R 2022/468; B60R 22/3413; B60R 22/36; B60R 22/34
See application file for complete search history.

(56) References Cited

U.S. PATENT DOCUMENTS

| | | | |
|---|---|---|---|
| 7,631,831 B2* | 12/2009 | Hiramatsu | B60R 22/4628 242/374 |
| 9,555,768 B2 | 1/2017 | Gray et al. | |
| 9,744,940 B1* | 8/2017 | Kohlndorfer | B60R 22/4628 |
| 10,059,302 B2 | 8/2018 | Landbeck et al. | |
| 10,315,617 B2* | 6/2019 | Franz | B60R 22/38 |
| 11,007,975 B2* | 5/2021 | Tanaka | B60R 22/4633 |
| 2002/0040582 A1 | 4/2002 | Kameyoshi et al. | |
| 2015/0336539 A1 | 11/2015 | Gray et al. | |

FOREIGN PATENT DOCUMENTS

| | | |
|---|---|---|
| KR | 10-2016-0042588 A | 4/2016 |
| WO | 2017/180833 A1 | 10/2017 |

OTHER PUBLICATIONS

International Search Report and Written Opinion dated Feb. 17, 2021 issued in related International Application No. PCT/US2020/058435; filed Oct. 31, 2020.

\* cited by examiner

SEAT BELT RETRACTOR

CROSS REFERENCE TO RELATED APPLICATION

This application claims priority to and the benefit of U.S. Provisional Patent Application No. 62/929,059 filed Oct. 31, 2019. The foregoing provisional application is incorporated by reference herein in its entirety.

GENERAL DESCRIPTION

The present disclosure relates to a seat belt system. In particular, a seat belt retractor that includes a system for containing hot, pressurized gas from a pretensioner of a retractor.

Seat belt systems may include a retractor or winding device to retract or wind up any excess amount of seat belt webbing that has been extended after the seat belt is latched. These seat belt retractors may also include a mechanism (e.g., a motor) for winding up the seat belt and for controlling the tension of the seat belt when the seat belt is being worn by the occupant of the vehicle. Thus, the motorized retractor may be configured to operate in both directions to wind and unwind the belt.

The retractor system may also include a pretensioner device (e.g., a pyrotechnic driven device) for tensioning the seat belt. The pretensioner is for removing a slack in the webbing during an emergency, such as a vehicle collision. Typically, spherical-shaped metal members act as a power transmission system for rotating a spool during an emergency. Other methods may include a deformable, elongated component (e.g. a resin rod) for rotating the spool as the power transmission system. The power transmission system is disposed inside a pretensioner tube configured as a pressure container. A gas generator is disposed at one end of the pretensioner tube and during an emergency, such as a vehicle collision, a hot, high-pressure operating gas is supplied from the gas generator to the inside of the pretensioner tube. The operating gas presses a piston to slide inside the pretensioner tube and the piston presses against the power transmission system to engage teeth of a drive wheel to rotate the spool in order to tension the seatbelt immediately after an impact of the vehicle to enhance occupant restraint performance. During this event the high-pressure operating gas may leak due to tolerances between elements in the pretensioner tube and may reduce the effectiveness of the pretensioner and may release hot, pressurized gas into the vehicle environment.

Accordingly, it is desired to improve the sealing capability of the pretensioner system.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

A seat belt retractor includes a pretensioner device with a seal system that includes a stopper tube that is inserted from an open end of a pretensioner tube to create a stop location for a driving piston to prevent operating gas from a gas generator from exiting the end of the pretensioner tube. The disclosed pretensioner device includes improved sealing capabilities because the seal system does not include a constriction in the interior diameter of the pretensioner tube. The system also does not include a plate inserted through the sidewall of the tube.

One embodiment of the seal system includes a stopper tube disposed at an end of the pretensioner tube. The stopper tube is inserted from the downstream end of the pretensioner tube. The stopper tube is held onto the pretensioner tube via a stopper pin which is inserted on a lateral side of the pretensioner tube and the stopper tube. During a pretensioning event, the release of the operating gas pushes a piston and seals the pretensioner tube via engagement of the piston with an upstream end of the stopper tube. The stopper pin holds the stopper tube in place in the pretensioner tube so that the seal created by the piston against the stopper tube is maintained.

In another embodiment of the seal system, the stopper tube includes a guide block that is inserted into a downstream end of the stopper tube. The downstream end of the stopper tube includes a stopper tube slot in which a projection of the guide block may be inserted into. The pretensioner tube may also include a slot configured to receive the projection of the guide block. The guide block may comprise a flange which blocks the downstream end of the stopper tube. The guide block includes a groove in which the stopper pin is inserted into. The groove of the guide block is configured to engage the stopper pin. The projection of the guide block holds the stopper tube, via the stopper tube slot, from moving from the force of the operating gas pressing the piston onto the stopper tube during the pretensioning event.

In another embodiment of the seat system, the guide block comprises a guide block trench disposed on the underside of the guide block, configured to engage a projection connected to a frame of the retractor. The projection extends from the frame of the retractor and extends through the pretensioner tube slot, through the stopper tube slot and into the guide block trench to hold and engage the stopper tube (via the stopper tube slot) and the guide block (via the guide block trench) to prevent the stopper tube from moving in a pretensioning event.

Figure 1:
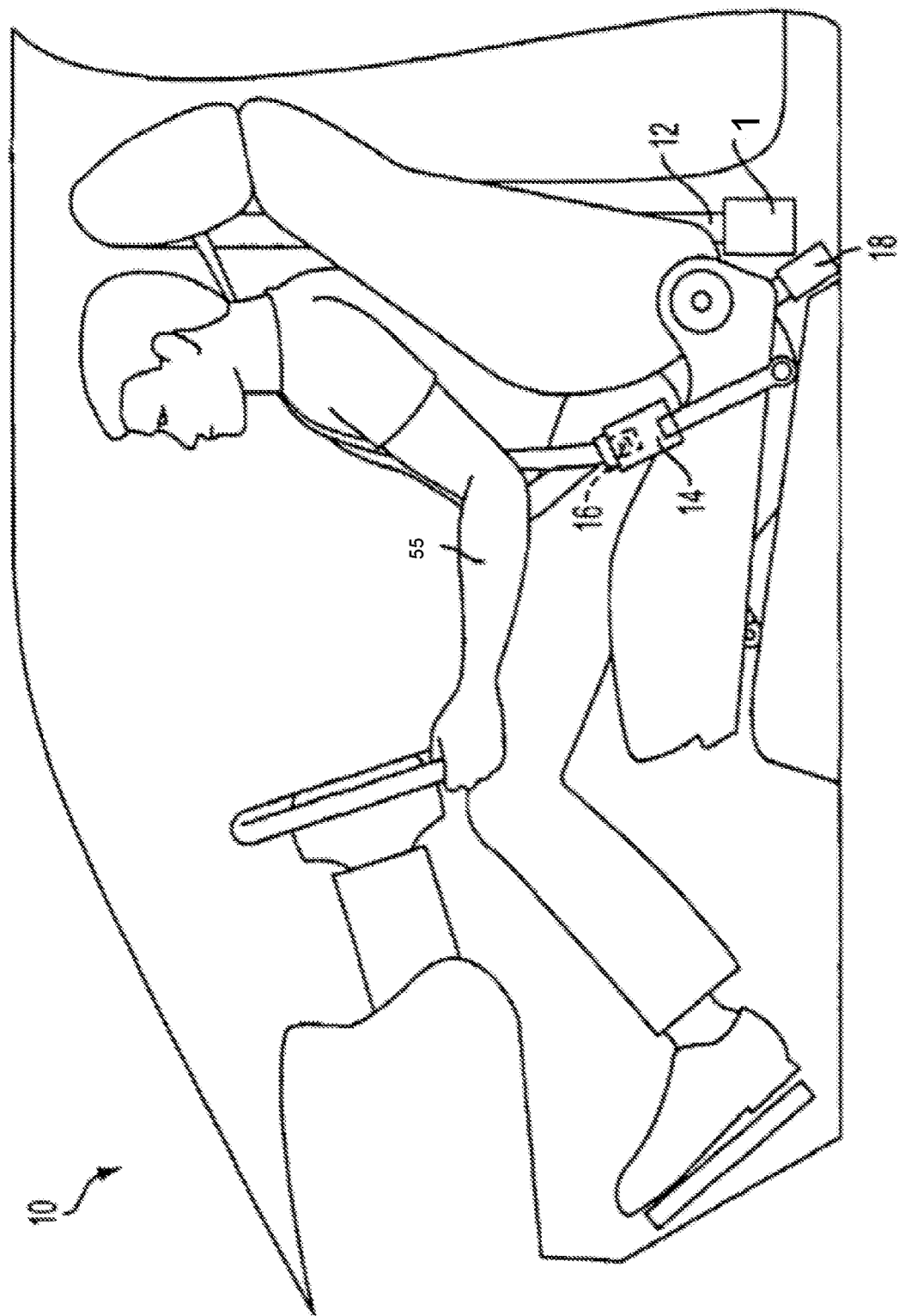
FIG. 1 is a side view of a vehicle showing a seat belt system including a retractor with a pretensioner device according to an exemplary embodiment.

Referring to FIG. 1, a seat belt system 10 is shown according to an exemplary embodiment. The seat belt system 10 is employed within a vehicle to help restrain the movement of an occupant 55 during a sudden acceleration, typically resulting from a dynamic impact event of the vehicle. The term acceleration refers to the absolute value of the acceleration that the vehicle experiences, whether negative (e.g., deceleration) or positive. The seat belt system 10 includes a webbing or a belt 12, a buckle 14, a tongue member 16 to engage the buckle 14, an anchor member 18, and a retractor 1. During a dynamic impact event of the vehicle, the retractor 1 locks the webbing from extracting or unwinding, which restricts movement of the occupant. The seat belt system 10 includes one or more sensors (not shown) configured to detect an emergency event (e.g. vehicle collision). A pretensioner device (not shown in FIG. 1) of the retractor 1 is used to remove slack of the webbing during the dynamic impact event (i.e., a pretensioning event).

Figure 2:
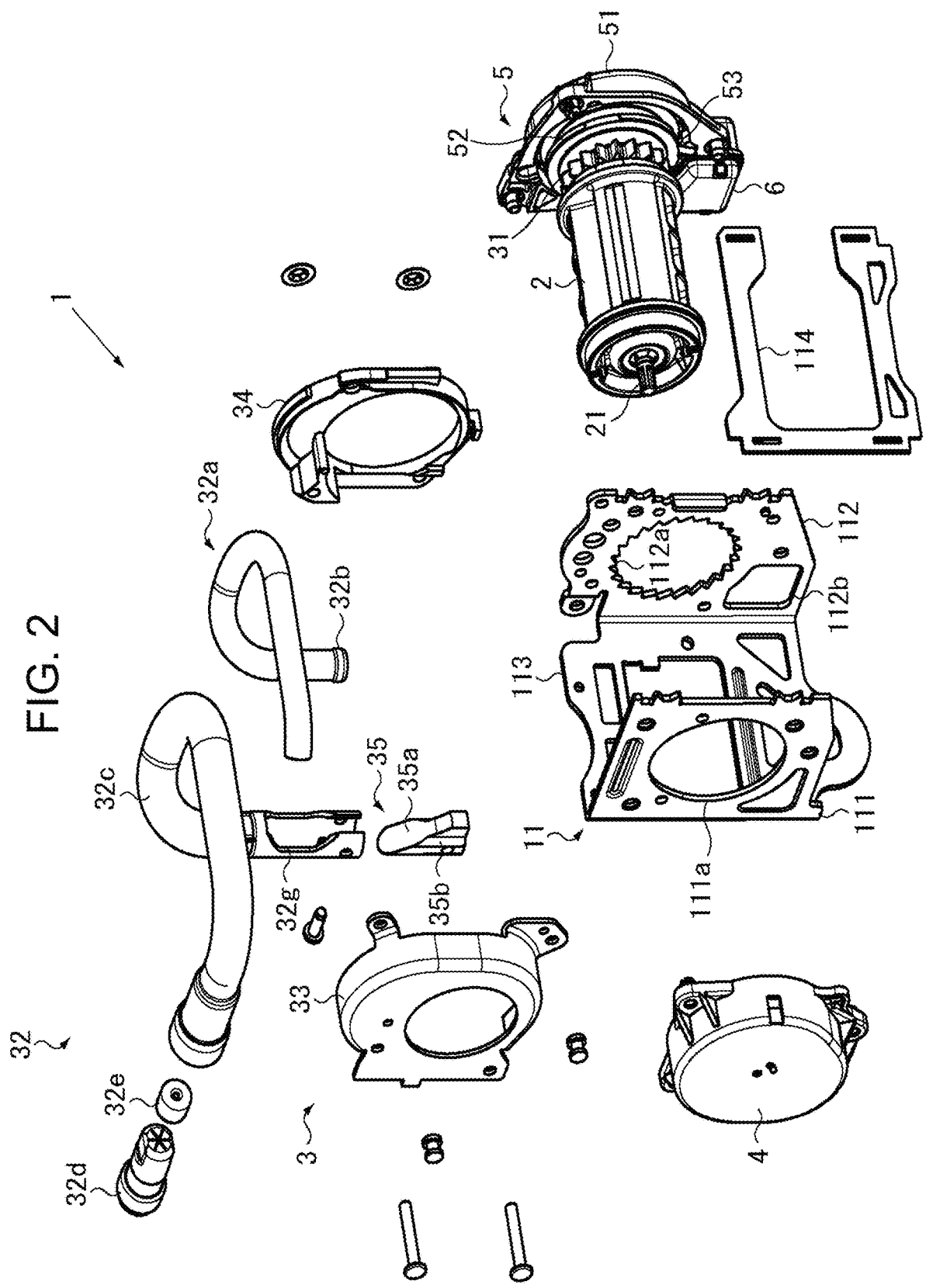
FIG. 2 is an exploded view of an exemplary retractor including a pretensioner device.

As shown in FIG. 2, the retractor 1 includes a spool 2 for winding webbing for restraining an occupant, and an exemplary pretensioner 3 for winding webbing to remove slack in a pretensioning event. The pretensioner 3 includes a ring gear 31 connected to the spool 2 and a power transmission device 32 for transmitting power to the ring gear 31 during the pretensioning event. A power transmission member 32a is configured to rotate the ring gear 31. The power transmission member 32a may be configured to plastically deform while the ring gear 31 is rotated and engaged. In FIG. 2, the illustration of the webbing is omitted. The power transmission member 32a may be a deformable resin rod. Other power transmission members may be used, for example, a series of spherical shaped driving elements may be used to engage and rotate the ring gear 31.

The spool 2 is a winding drum for winding the webbing and is rotatably accommodated in a base frame 11 forming a frame of the retractor 1. The base frame 11 has, for example, a pair of end surfaces 111 and 112 facing each other, and a side surface 113 connecting the end surfaces. The base frame 11 may have a tie plate 114 connected to the end surfaces 111, 112. Further, for example, the spring unit 4 is disposed on the end surface 111 side, and the pretensioner 3 and the lock mechanism 5 are disposed on the end surface 112 side. The arrangement of the spring unit 4, the pretensioner 3, the lock mechanism 5, and the like is not limited to the illustrated configuration.

Further, an opening 111a for inserting the shaft of the spool 2 is formed in the end surface 111 of the base frame 11, and an end surface 112 of the base frame 11 is engaged with a pawl (not shown) of the locking mechanism 5. An opening 112a is formed having possible internal teeth. Further, adjacent an inside of the end surface 112 of the base frame 11, a part of the pretensioner 3 (for example, the ring gear 31 or the like) is disposed. Further, the lock mechanism 5 is disposed adjacent an outside the end surface 112 of the base frame 11, and the lock mechanism 5 is accommodated in the retainer cover 51.

The retainer cover 51 may be provided with a vehicle sensor 6 for detecting rapid deceleration or acceleration of the vehicle body. The vehicle sensor 6 has, for example, a spherical mass and a sensor lever that is swung by the movement of the mass. The vehicle sensor 6 is fitted in and fixed to an opening 112b formed in the end surface 112 of the base frame 11.

The spool 2 may have be hollow at the center and a torsion bar 21 forming an axial center may be inserted therethrough. The torsion bar 21 is connected to the locking base 52 of the locking mechanism 5 whose first end is connected to the end of the spool 2 and whose second end is connected to the spring core of the spring unit 4. Therefore, the spool 2 is connected to the spring unit 4 via the locking base 52 and the torsion bar 21 and is biased in the direction to wind up the webbing by the spring stored in the spring unit 4.

The first end of the torsion bar 21 may be connected to the spool 2 without the locking base 52. Further, the means for applying the winding force to the spool 2 is not limited to the spring unit 4 and may be another means using an electric motor or the like.

The locking base 52 is provided with a pawl arranged to be able to protrude and retract from its side portion. At the time of operation of the lock mechanism 5, the pawl is made to project from the side surface portion of the locking base 52 to engage with the internal teeth formed in the opening 112a of the base frame 11, thereby restraining the rotation of the locking base 52 in the webbing pull-out direction.

Therefore, even if a load is applied in the webbing pull-out direction in a state where the lock mechanism 5 is actuated, the spool 2 can be held in a non-rotational state until a load equal to or greater than a threshold is generated on the torsion bar 21. When a load equal to or greater than the threshold value is generated on the torsion bar 21, the torsion bar 21 is twisted, causing the spool 2 to relatively rotate, and the webbing is pulled out.

The lock mechanism 5 also includes a lock gear 53 disposed to be adjacent to the locking base 52. The lock gear 53 is provided with a flywheel (not shown) disposed swingably, and when the webbing is drawn out faster than the normal drawing speed, the flywheel is swung to engage with the internal teeth (not shown) which prevents the webbing from being pulled out further. When the vehicle sensor 6 is actuated, the sensor lever engages with the external teeth formed on the side surface of the lock gear 53.

Thus, the lock gear 53 is restricted in rotation by the actuation of the flywheel or the vehicle sensor 6. Then, when the rotation of the lock gear 53 is restricted, relative rotation occurs between the locking base 52 and the lock gear 53, and the pawl is protruded from the side surface portion of the locking base 52 along with the relative rotation. The lock mechanism 5 is not limited to the illustrated configuration, and various configurations existing conventionally can be arbitrarily selected and used.

The pretensioner 3 includes, for example, a ring gear 31 disposed coaxially with the spool 2, a power transmission device 32 for rotating the ring gear 31, a pretensioner cover 33 for storing the ring gear 31, and a power transmission member 32a. A guide spacer 34 forming a moving space, a guide block 35 disposed at a meshing start portion of the ring gear 31, and the power transmission member 32a are provided.

The pretensioner cover 33 is disposed adjacent the end surface 112 of the base frame 11, and the guide spacer 34 is accommodated in the pretensioner cover 33. The ring gear 31 is disposed so as to be located in the space between the pretensioner cover 33 secured by the guide spacer 34 and the end surface 112.

Figure 3:
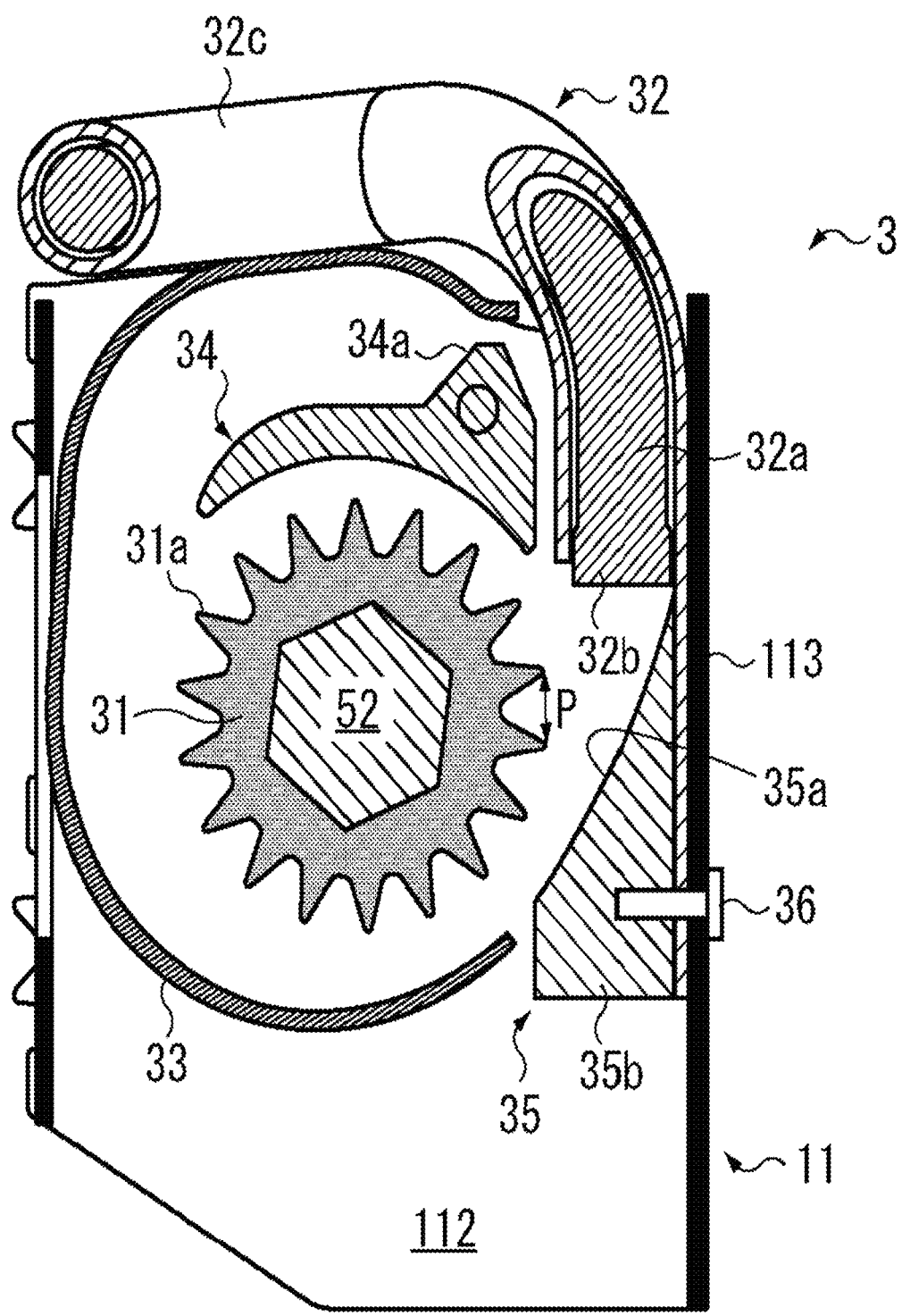
FIG. 3 is a sectional view of the retractor of FIG. 2.

The ring gear 31 is fixed to, for example, a shaft portion of the locking base 52. The ring gear 31 has, as shown in FIG. 3, a plurality of engaging teeth 31a formed to project radially outward. The ring gear 31 may be a pinion gear.

The power transmission device 32 includes, for example, a rod-shaped power transmission member 32a that transmits power to the ring gear 31 while plastically deforming, a pretensioner tube 32c that accommodates the power transmission member 32a, and a gas generator 32d disposed at an upstream end of the pretensioner tube 32c. The gas generator 32d is configured to release hot operating gas and push a piston 32e in the pretensioner tube 32c.

The pretensioner tube 32c is disposed at a position where the downstream end faces the engagement teeth 31a of the ring gear 31. As shown in FIG. 2, an opening 32g is formed in a part of the outer periphery of the pretensioner tube 32c at the downstream end, and the power transmission member 32a is released into the pretensioner cover 33 from the opening 32g.

Further, as shown in FIG. 3, the guide block 35 is inserted into the end of the pretensioner tube 32c, and the ends of the guide block 35 and the pretensioner tube 32c are fixed to the side surface 113 of the base frame 11 by the fixing pin 36. The guide block 35 has an inclined surface 35a for guiding the movement of the power transmission member 32a, and a main body 35b fixed to the base frame 11 (side surface 113).

As shown in FIG. 2, the guide block 35 comprises an elongated shape that can be inserted into the downstream end of the pretensioner tube 32c, and an inclined surface 35a is formed on the upstream end face thereof. The guide block 35 is a component for guiding the downstream end 32b of the power transmission member 32a to collide with the engagement teeth 31a of the ring gear 31 when the pretensioner 3 is actuated. The inclined surface 35a may be a flat surface or a curved surface configured to guide the power transmission member 32a.

The guide block 35 is also a component that receives an impact force generated when the power transmission member 32a collides with the engagement tooth 31a at its downstream end 32b. The guide block 35 may be made of resin or metal of sufficient strength to withstand the load generated when the power transmission member 32a collides with the engagement teeth 31a. The guide block 35 is fixed to the base frame 11 having high strength by the fixing pin 36. The power transmission member 32a is guided to the ring gear 31 by the guide block 35 which neither deforms nor displaces when the pretensioner 3 is actuated. The power transmission member 32a is, for example, an elongated shape (rod shape) made of resin, and is accommodated in the pretensioner tube 32c.

Figure 4:
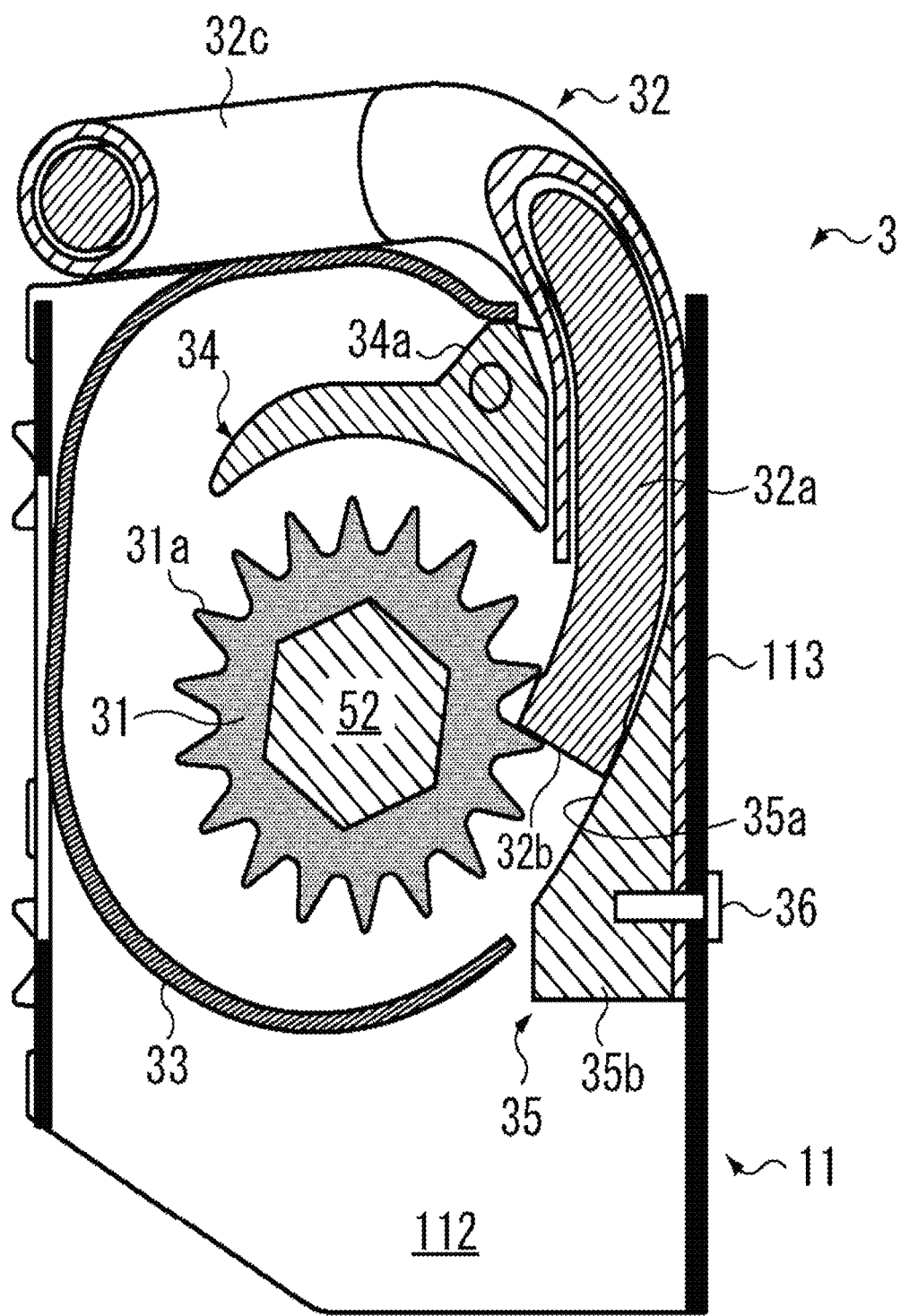
FIG. 4 is a sectional view of the retractor of FIG. 2.
Figure 5:
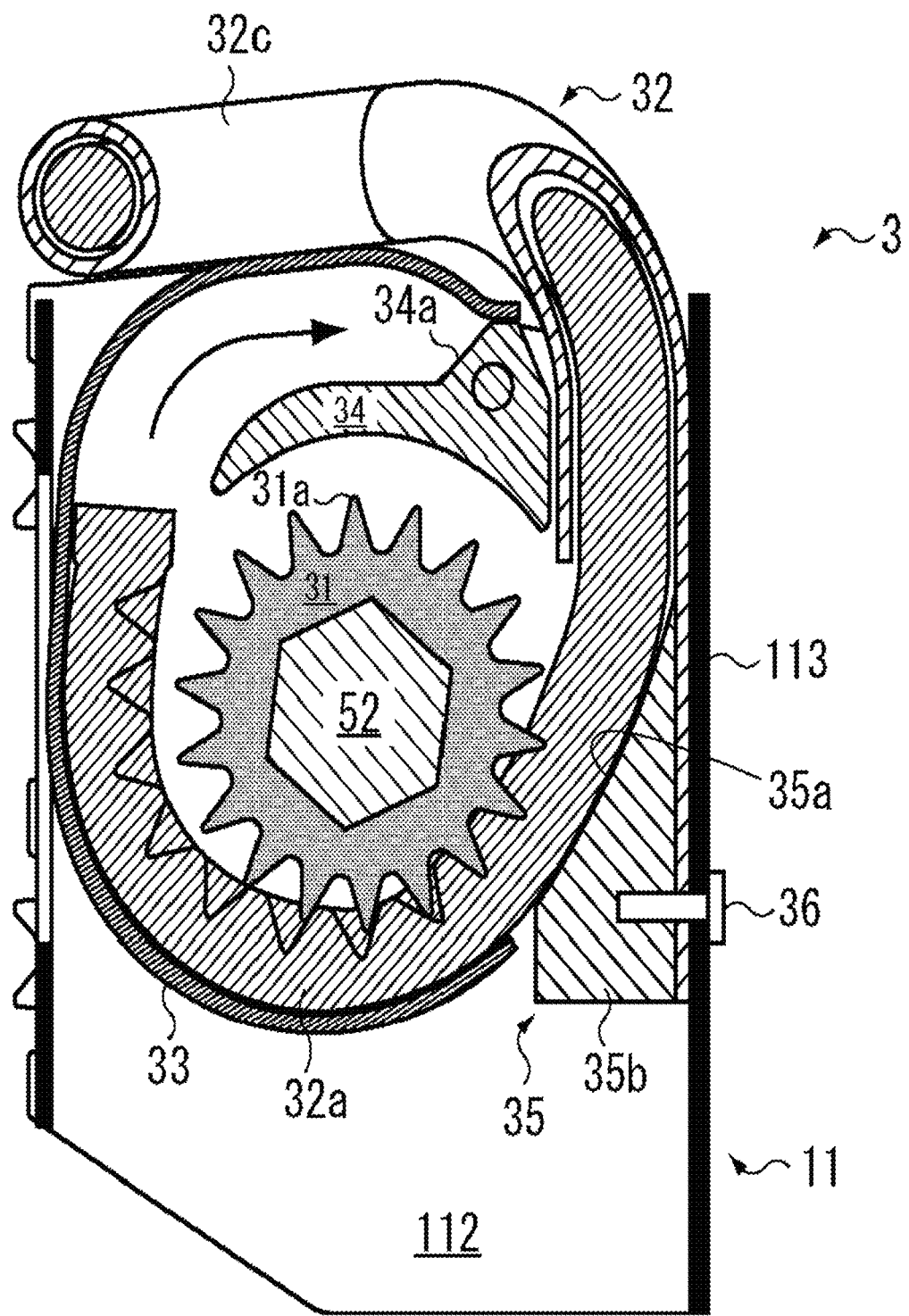
FIG. 5 is a sectional view of the retractor of FIG. 2.

As shown in FIG. 3, in a normal state (when the pretensioner 3 is not operated), the power transmission member 32a is contained inside the pretensioner tube 32c. Then, in a pretensioning event, such as a vehicle collision, the pretensioner 3 activates and the power transmission member 32a is pushed out in the pretensioner tube 32c by the gas supplied by the gas generator 32d. The power transmission member 32a is pushed out of the pretensioner tube 32c and moves along the inclined surface 35a of the guide block 35 and collides with the engagement teeth 31a of the ring gear 31, as shown in FIG. 4. Thereafter, as shown in FIG. 5, the power transmission member 32a is pushed out to the space (passage) formed by the pretensioner cover 33 and the guide spacer 34 and is engaged with the engagement teeth 31a of the ring gear 31. The ring gear 31 rotates by engaging a plurality of engagement teeth 31a with the power transmission member 32a. Then, the power transmission member 32a stops by colliding with the stopper surface 34a formed by the guide spacer 34 after taking up the slack of the webbing.

Figure 6:
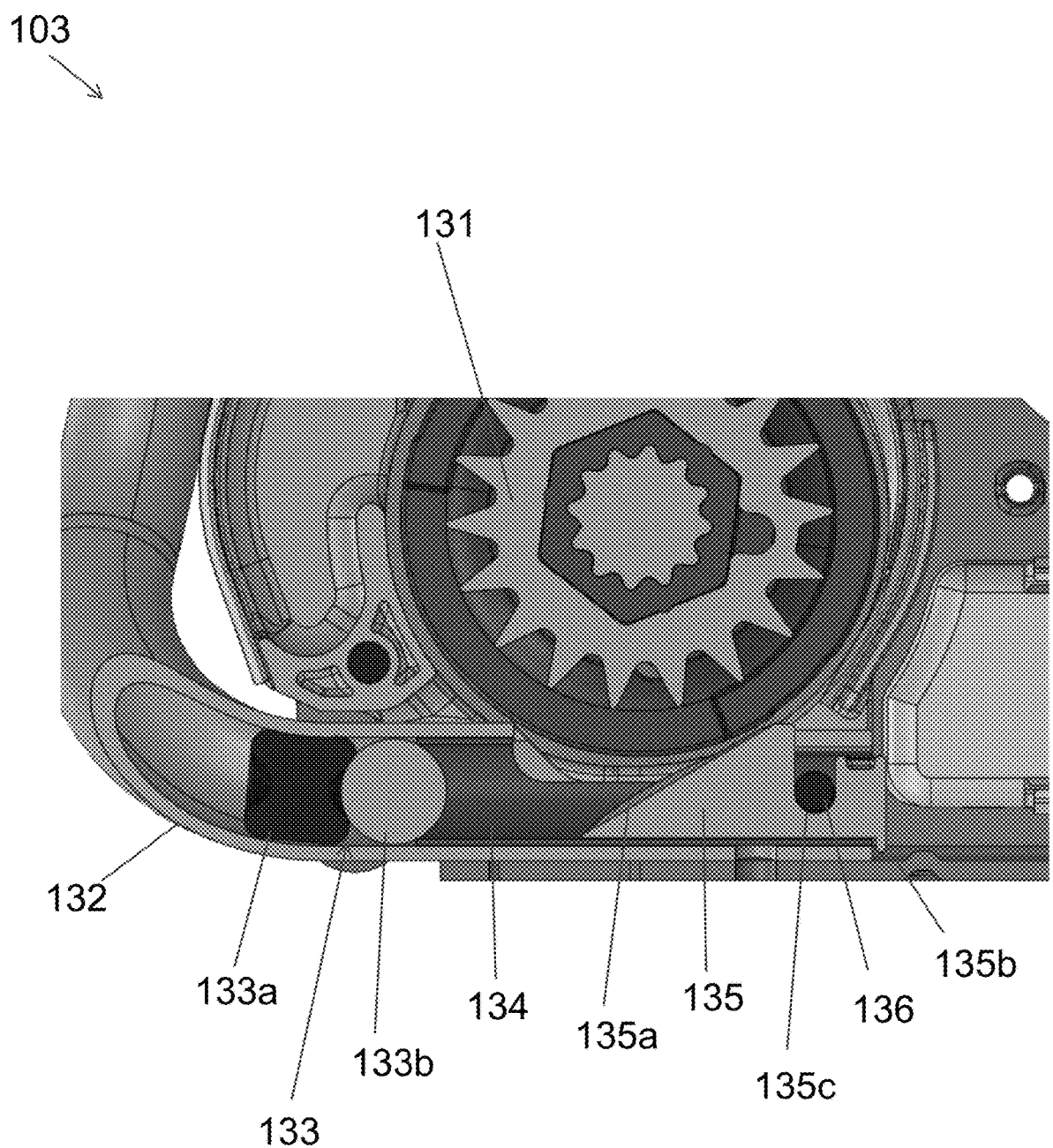
FIG. 6 is a sectional view of an exemplary retractor including a pretensioner device that includes a stopper tube.

FIG. 6 illustrates a close up of another exemplary pretensioner system 103 for use in a retractor as described above. The system includes a pretensioner tube 132 configured to house the power transmission member (omitted for clarity) that contacts and rotates the ring gear 131 when the pretensioner system 103 is activated during an emergency event. During the emergency event, the gas generator (not shown) located at the upstream end of the pretensioner tube 132 expels hot operating gas and pushes a piston 133 disposed upstream of the power transmission member. The piston 133 may include an upstream block 133a and downstream ball 133b. The upstream block 133a may be made from an elastically deformable material, such as rubber, and the downstream ball 133b may be made from metal, such as steel. The piston 133 pushes the power transmission member downstream through the pretensioner tube 132 and into engagement with the ring gear teeth 131a in order to retract the webbing of the seat belt system. In this embodiment, the piston 133 engages an upstream end of a stopper tube 134. The stopper tube 134 is disposed at least partially inside of and at a downstream end of the pretensioner tube 132. The piston 133 contacts and creates a seal with the stopper tube 134 in order to prevent hot operating gas from escaping the pretensioner tube 132. A guide block 135 is disposed at a downstream end of the stopper tube 134. The guide block 135 includes an inclined surface 135a formed on the upstream face thereof. The inclined surface 135a is configured to guide the power transmission member to the ring gear 131. The guide block includes a flange 135b at a downstream end thereof. A stopper pin 136 is inserted laterally through the pretensioner tube 132 and the stopper tube 134 in order to hold the stopper tube 134 in place when piston 133 seals and pushes against the upstream end of the stopper tube 134. The guide block 135 may contain a groove 135c which also engages the stopper pin 136 in order to hold and engage the stopper tube 134 at the flange 135b.

Figure 7:
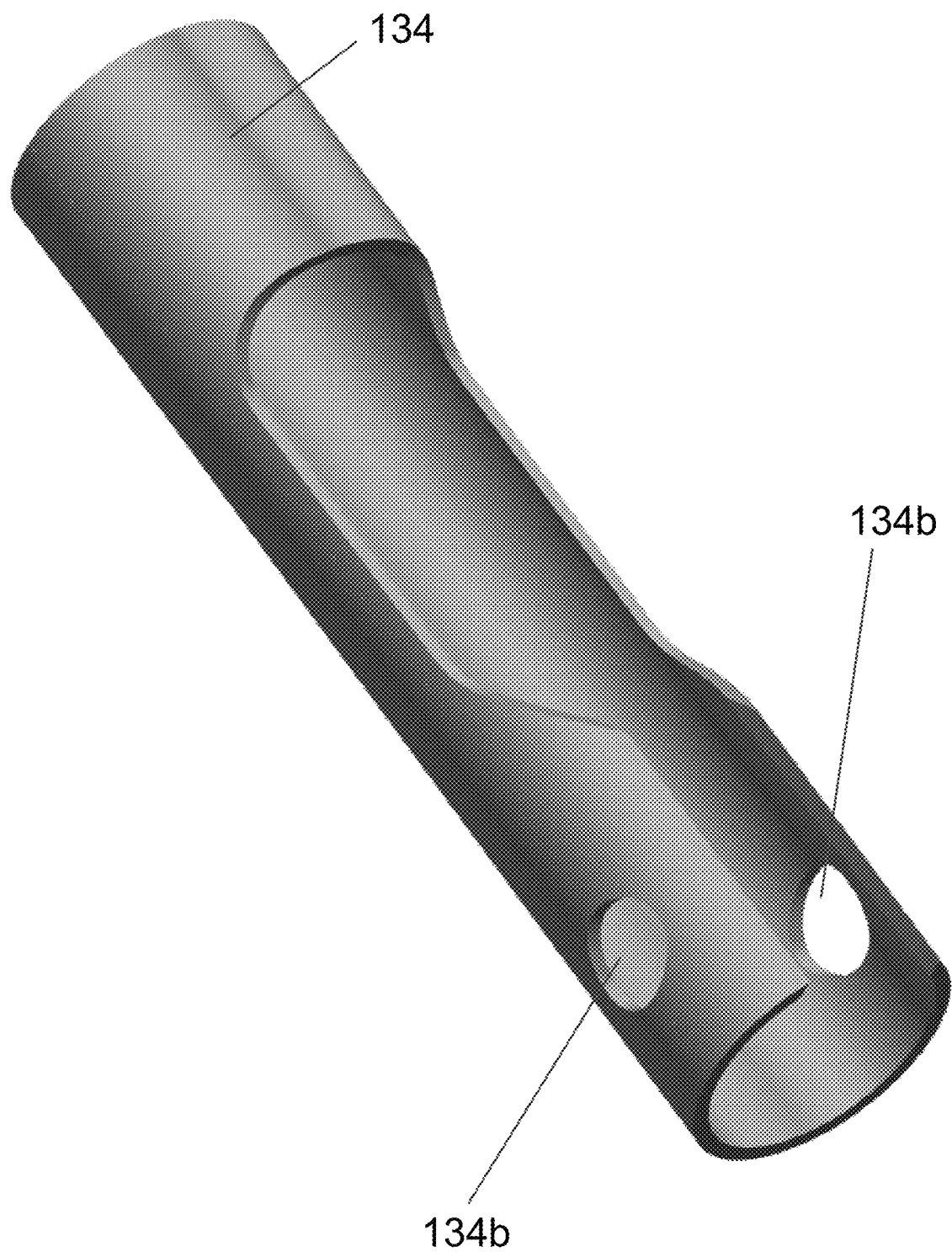
FIG. 7 is a top front view of an exemplary stopper tube of the pretensioner device of FIG. 6.
Figure 8:
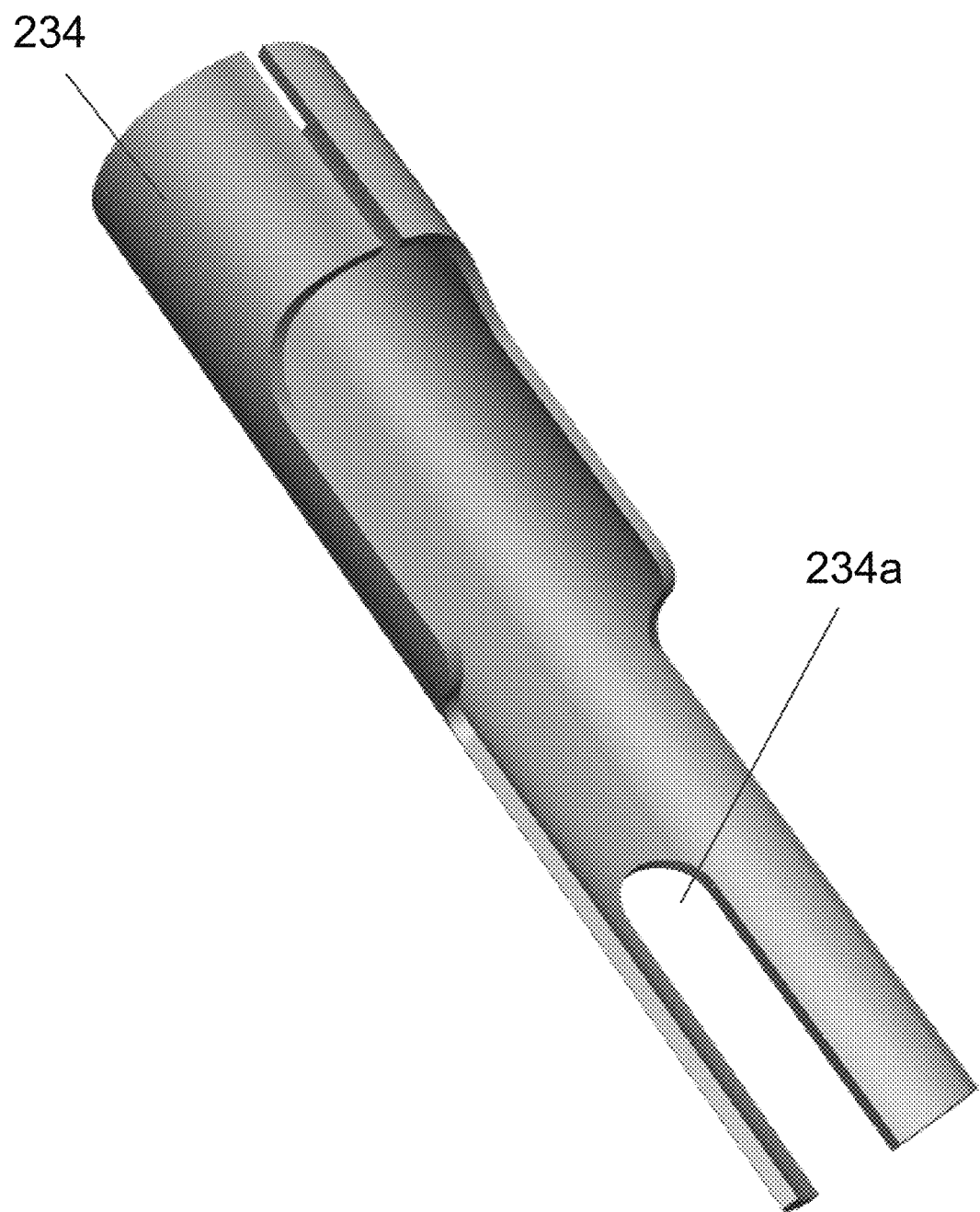
FIG. 8 is a top front view of a second embodiment of a stopper tube.
Figure 9:
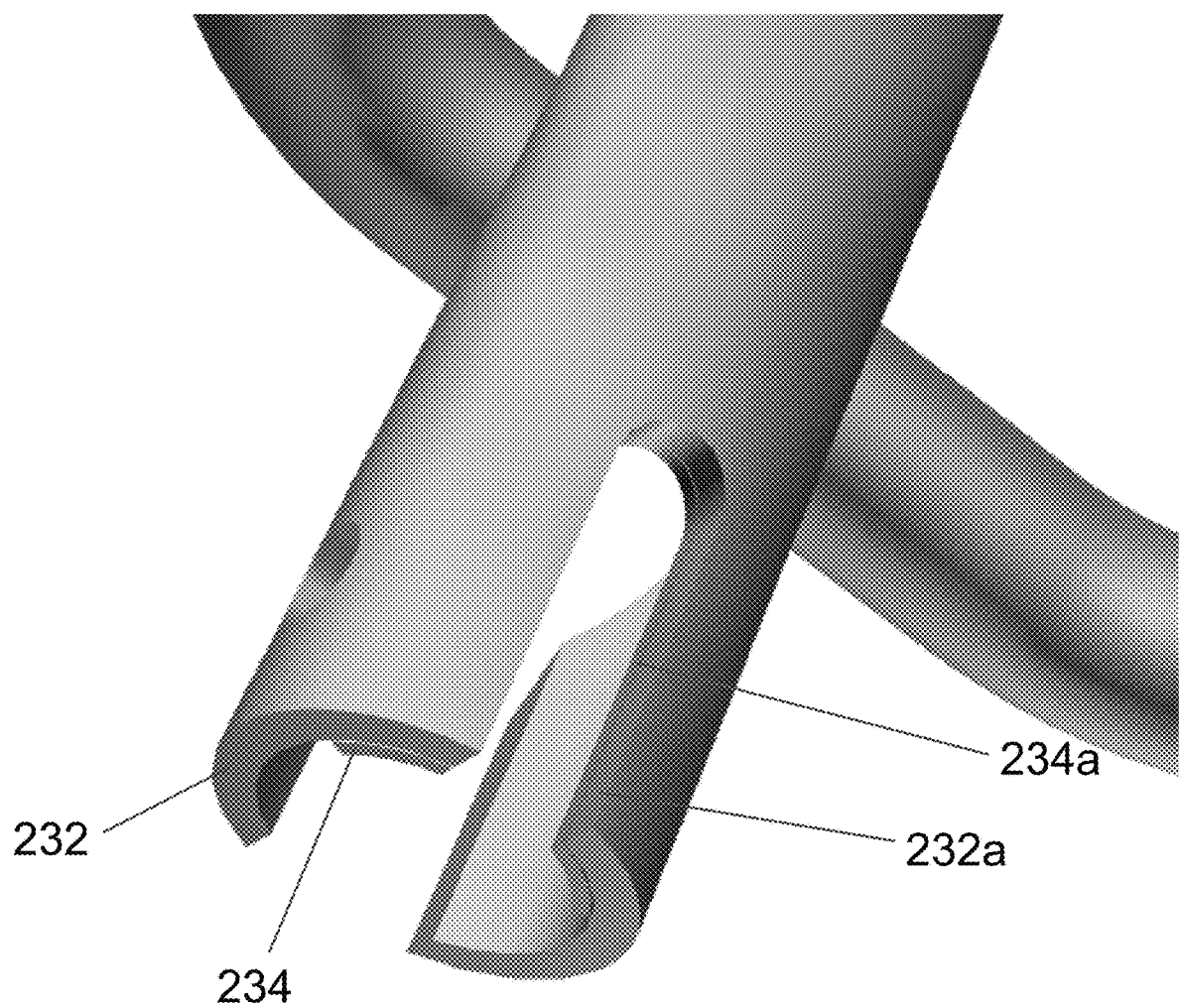
FIG. 9 is a bottom view of the stopper tube of FIG. 8, shown installed in the pretensioner tube.
Figure 10:
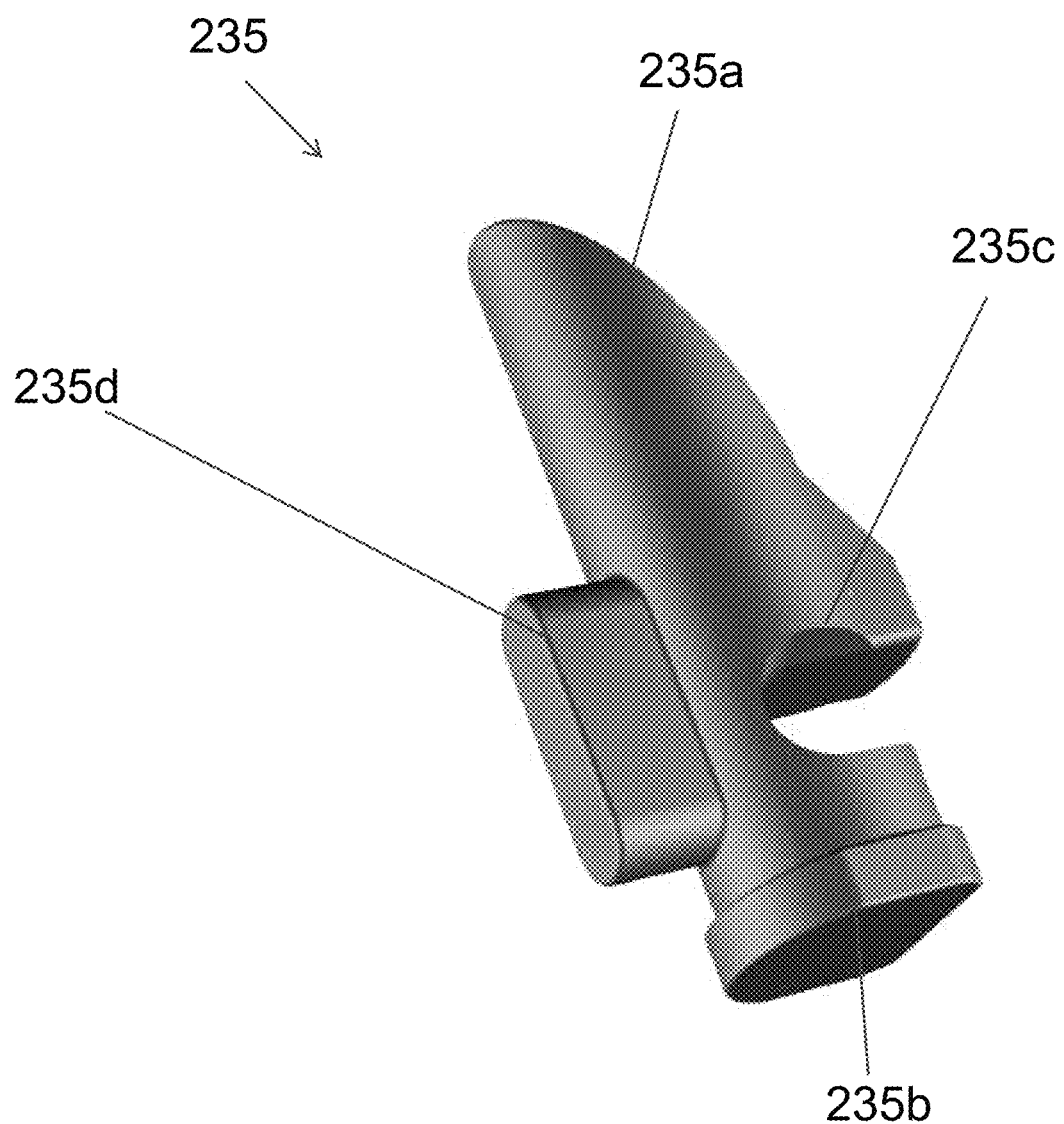
FIG. 10 is a bottom side view of an exemplary guide block for use with the stopper tube of FIG. 8.
Figure 11:
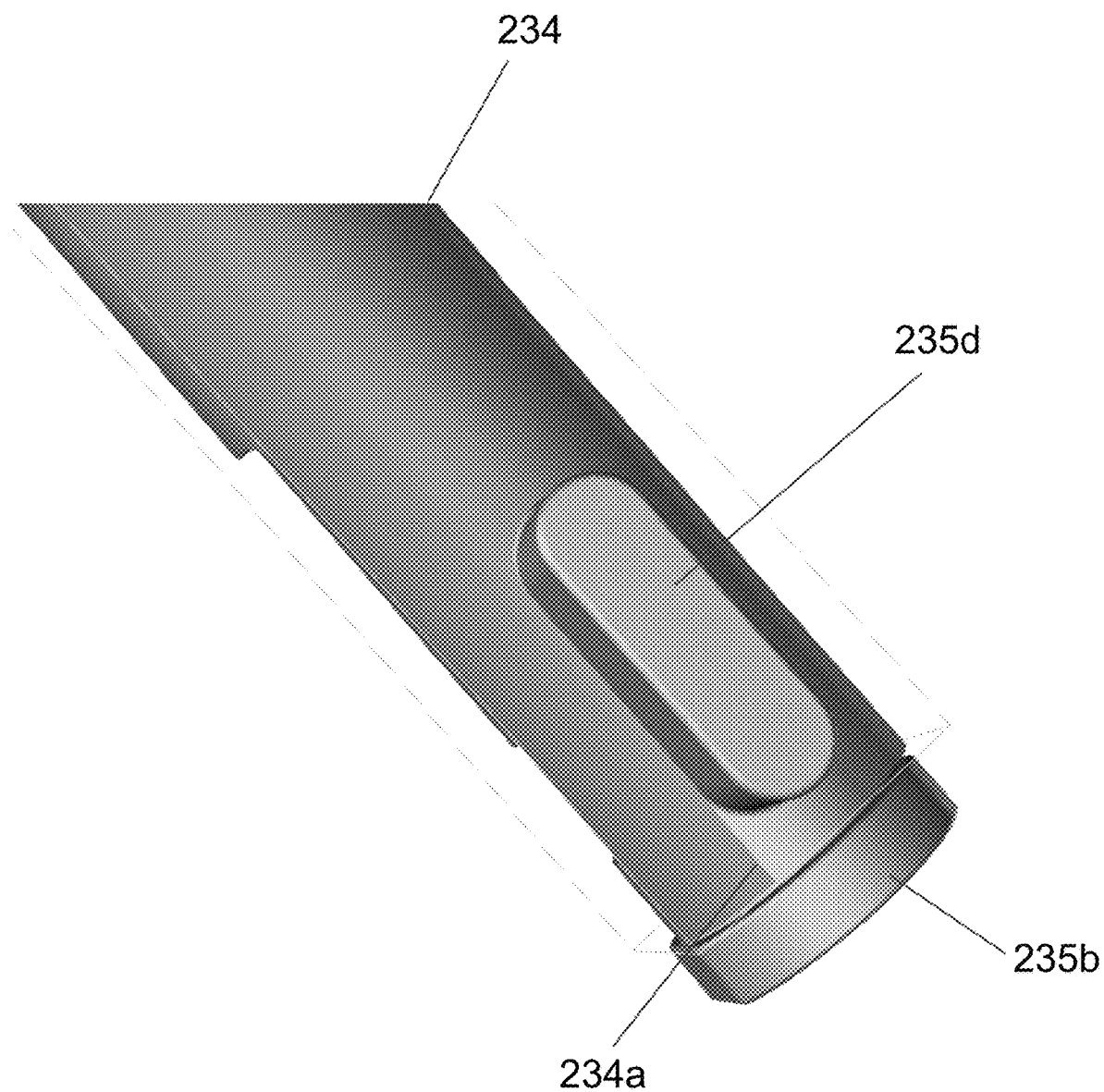
FIG. 11 is a bottom view of the guide block of FIG. 10 and stopper tube of FIG. 8.
Figure 12:
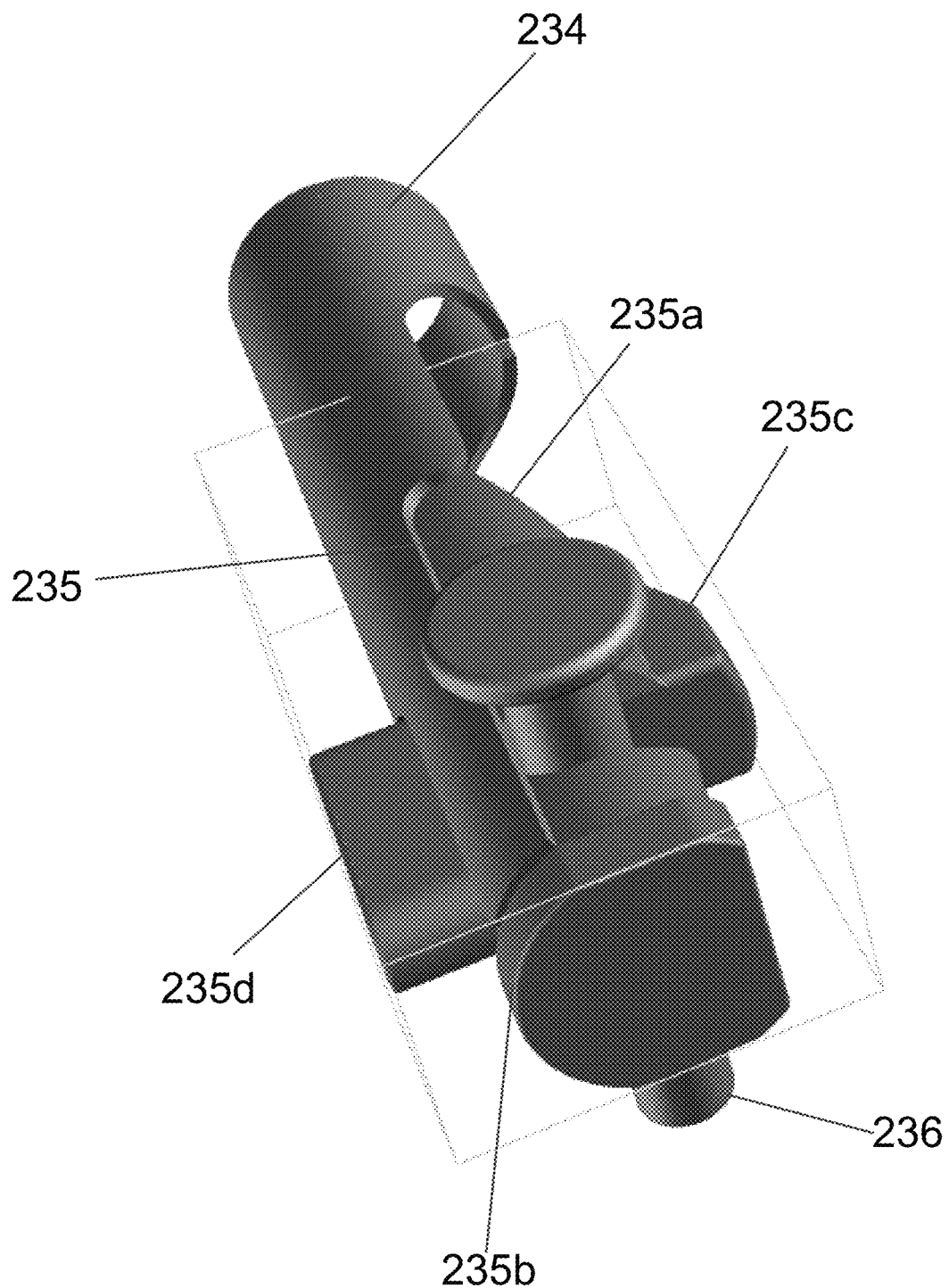
FIG. 12 is a front side view of the guide block of FIG. 10, stopper tube of FIG. 8, and a stopper pin.
Figure 13:
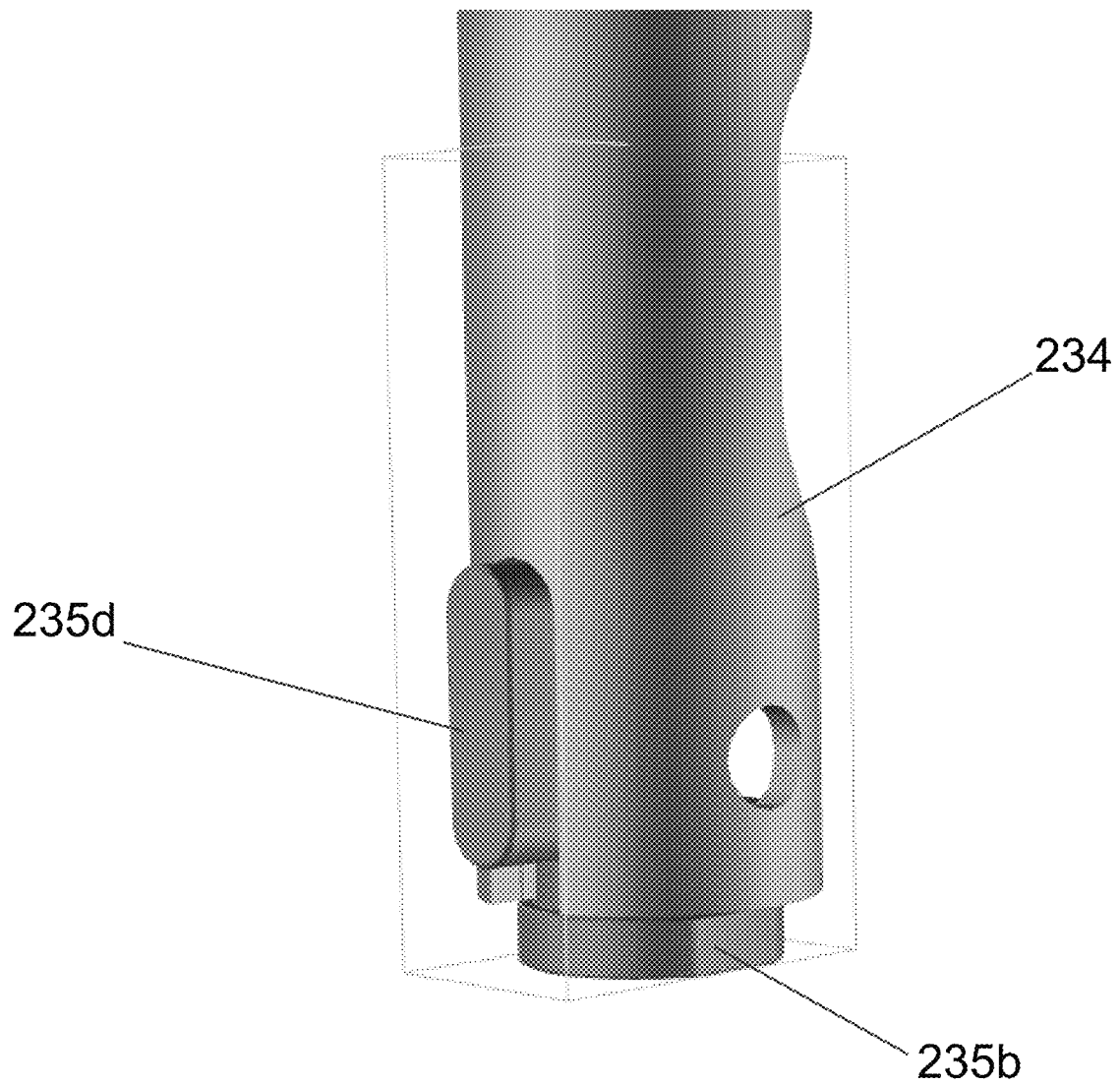
FIG. 13 is a bottom side view of the guide block of FIG. 10, stopper tube of FIG. 8, and a pretensioner tube.
Figure 14:
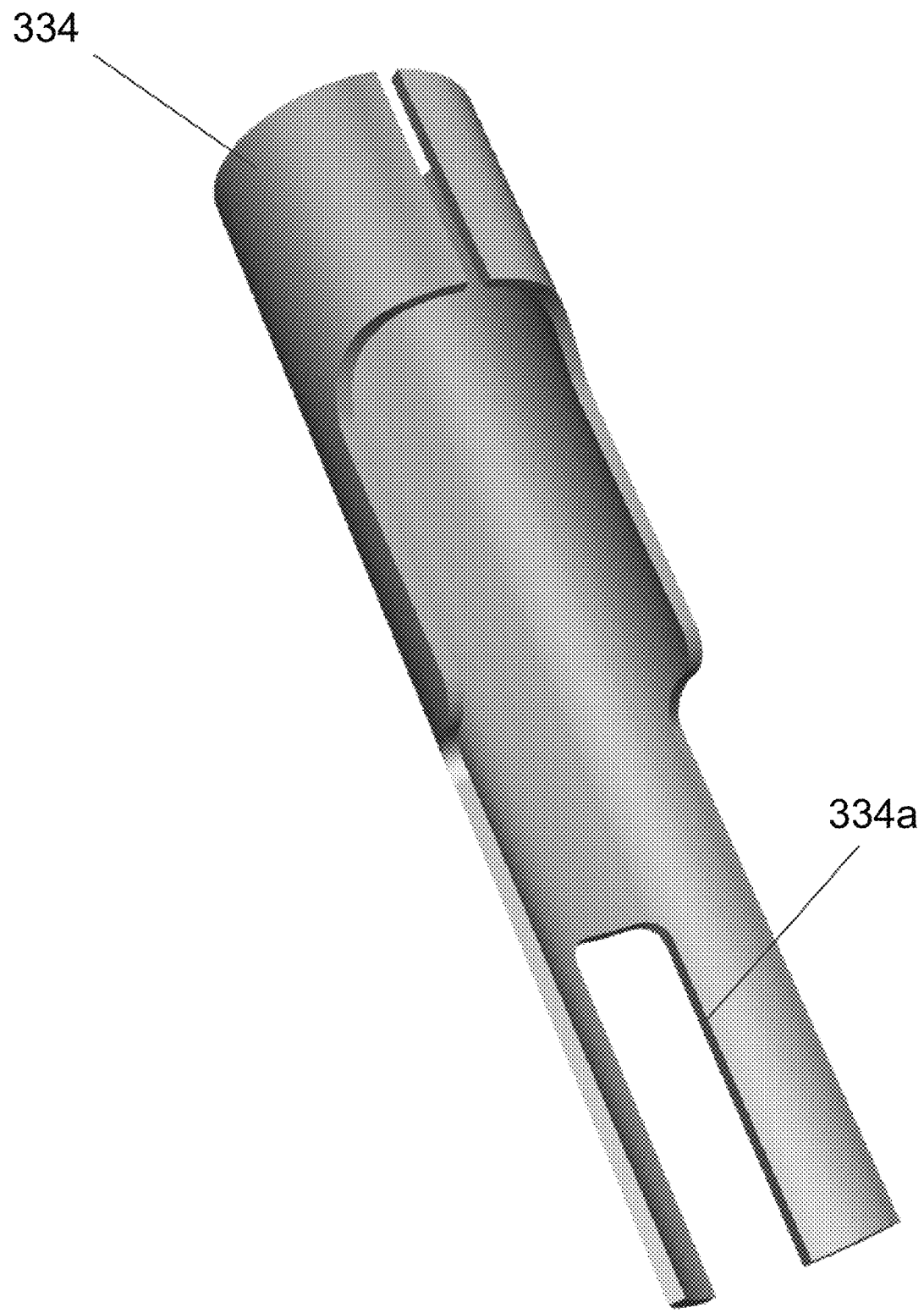
FIG. 14 is a top front view of a third embodiment of a stopper tube.
Figure 15:
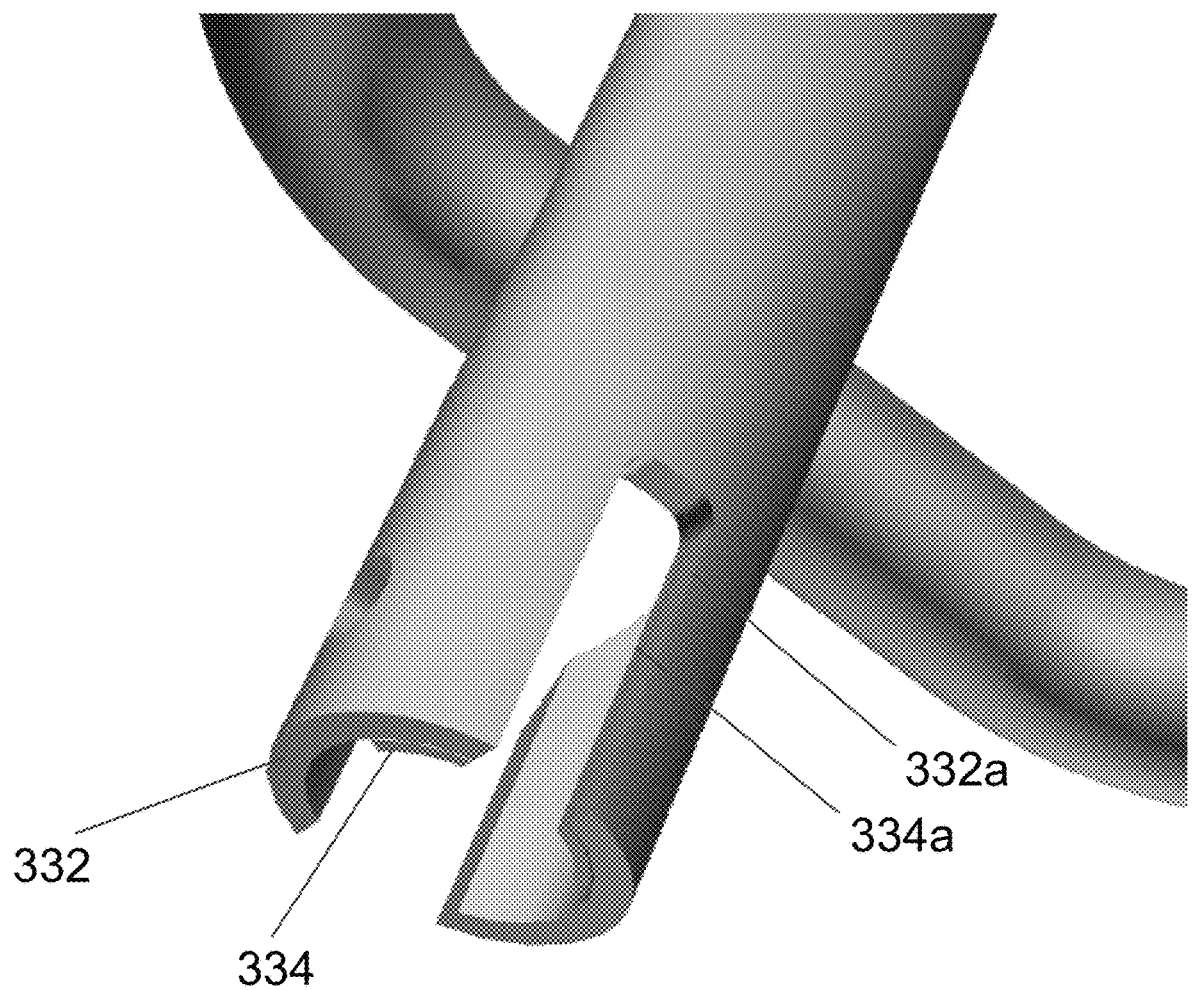
FIG. 15 is a bottom view of the stopper tube of FIG. 14 and the pretensioner tube.
Figure 16:
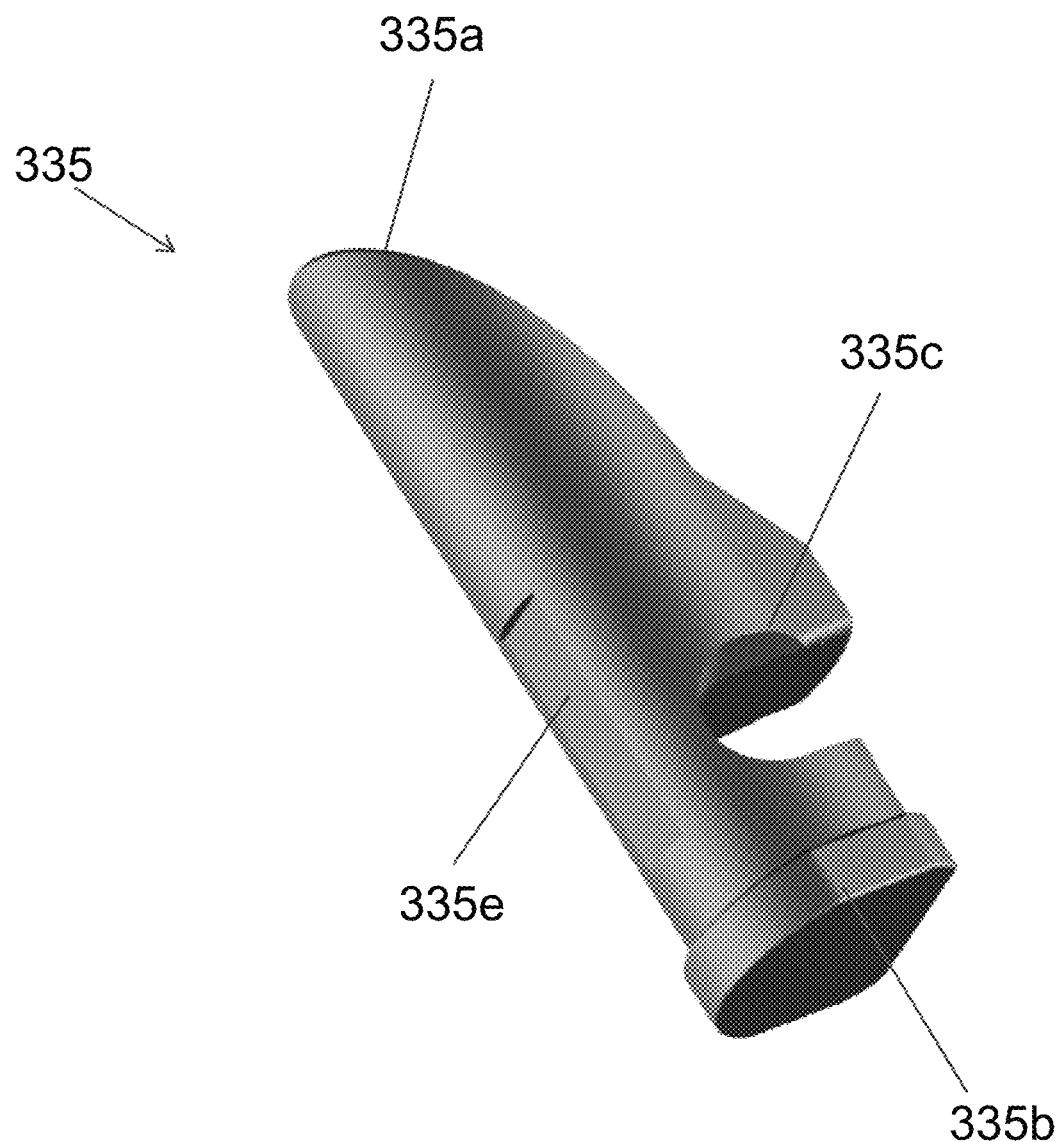
FIG. 16 is a bottom side view of a guide block for use with the stopper tube of FIG. 14.
Figure 17:
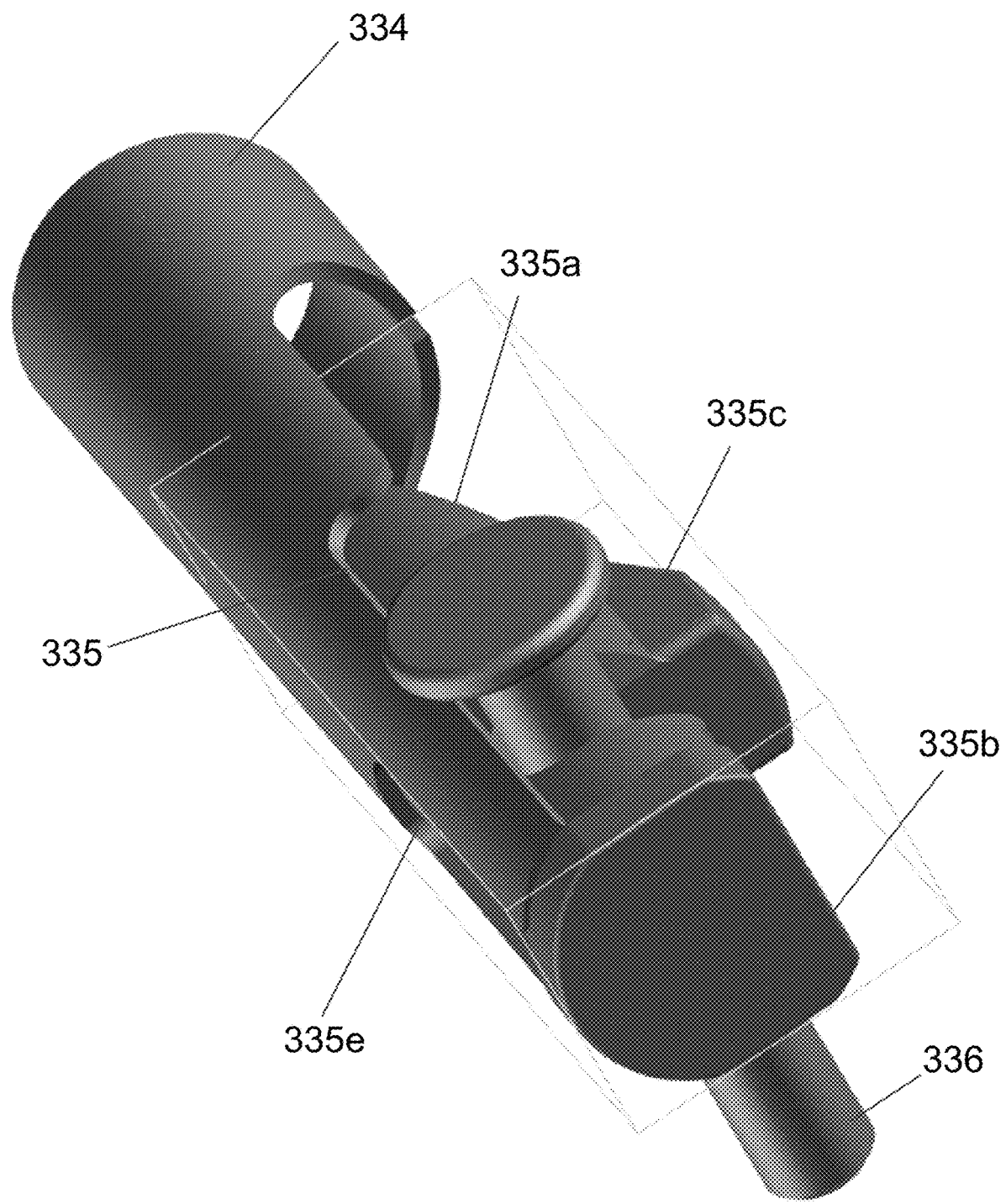
FIG. 17 is a front side view of the guide block of FIG. 16, stopper tube of FIG. 14, and a stopper pin.
Figure 18:
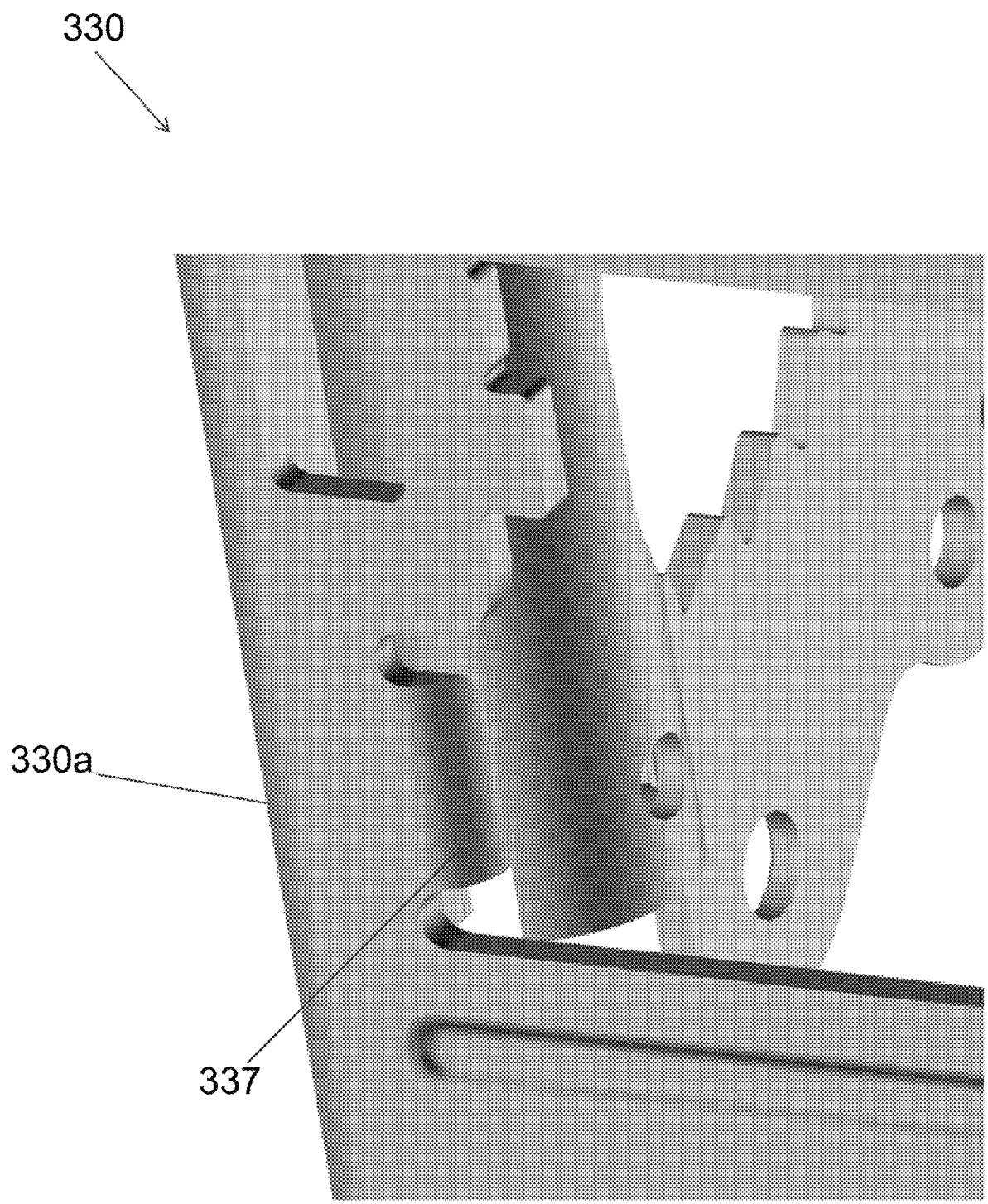
FIG. 18 is a bottom close up view of a portion of the retractor frame and the pretensioner tube.
Figure 19:
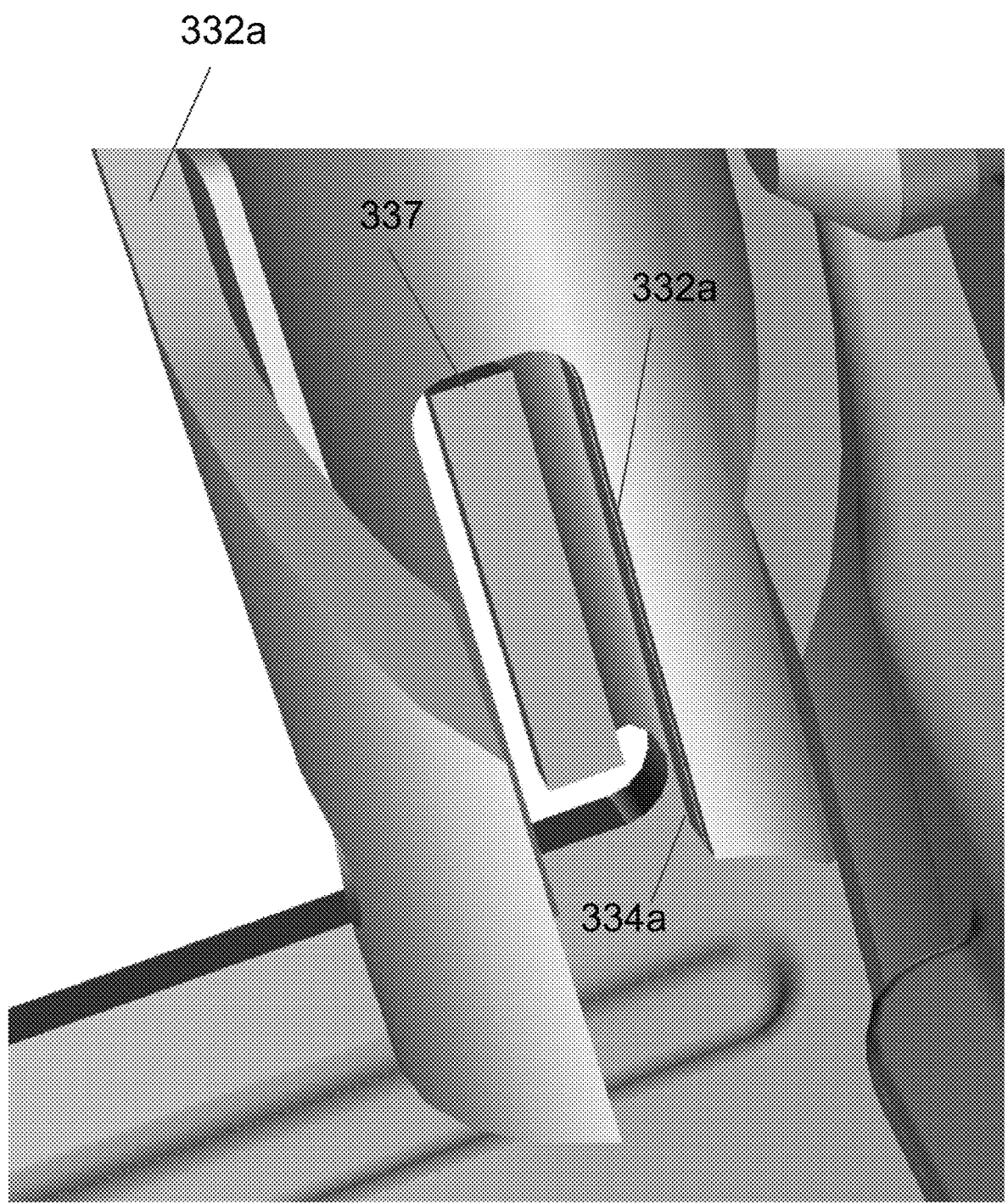
FIG. 19 is a top close up view of the retractor frame, pretensioner tube, and stopper tube of FIG. 14.

FIG. 7 illustrates the exemplary stopper tube 134 from FIG. 6, which includes two co-axial holes 134b for receiving and holding the stopper pin 136 (not shown). An upstream end of the stopper tube 134 is open in order to allow the power transmission member to travel and rotate the ring gear. The stopper tube 134 may be machined from a solid rod.

FIGS. 8-13 illustrates another exemplary embodiment of stopper tube 234 with a stopper tube slot 234a. The stopper tube slot 234a is configured to receive a projection 235d of a guide block 235. The stopper tube slot 234a may take on different shapes. In this embodiment, the pretensioner tube 232 may include pretensioner tube slot 232a. The pretensioner tube slot 232a is located on the pretensioner tube 232 overlapping the stopper tube slot 234a and is configured to receive the guide block projection 235d. The guide block 235 also includes an inclined surface 235a, a flange 235b, and a groove 235c which engages a stopper pin 236. The stopper tube 234 may formed by stamping and rolling to the required shape.

FIG. 14-19 illustrates another exemplary embodiment of stopper tube 334 with stopper tube slot 334a configured to receive a pretensioner projection 337. In this embodiment, the guide block 335 includes a guide block trench 335e configured to engage the pretensioner projection 337. The pretensioner projection 337 extends from a frame 330*a* of the pretensioner device 330 and extends through the pretensioner tube slot 332*a* in the pretensioner tube 332, through the stopper tube slot 334*a* and into the guide block trench 335*e* to hold and engage the stopper tube (via the stopper tube slot 334*a*) and the guide block 335 (via the guide block trench 335*e*) from moving in a pretensioning event. The guide block 335 also includes an inclined surface 335*a*, an optional flange 335*b*, and a groove 335*c* which engages a stopper pin 336.

In summary, a pretensioner device is provided with an improved sealing system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "upstream," "downstream," "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat belt retractor as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes, and omissions may also be made in the design, operating conditions and arrangement of the various exemplary embodiments without departing from the scope of the present disclosure.

What is claimed is:

1. A seatbelt retractor for a seat belt device in a vehicle, the retractor comprising:
    a frame;
    a spool configured to be fixed to one end of a webbing so that the webbing may be wound around the spool, the spool being rotatably mounted at both ends to the frame and configured to rotate in a webbing extraction direction and a webbing retraction direction;
    a pretensioner device configured to rotate the spool in a webbing retraction direction when the pretensioner device activates in response to an acceleration of the vehicle greater than a predetermined high acceleration; and
    wherein the pretensioner device comprises a power transmission element carried in a pretensioner tube that is driven by a piston located in the pretensioner tube when the pretensioner device is activated so that the power transmission element can contact a ring gear connected to the spool to thereby rotate the spool in the webbing retraction direction;
    wherein the pretensioner device includes a gas generator that is configured to create operating gas for driving the piston into the power transmission element;
    and wherein the pretensioner device includes a seal system that includes a stopper tube located in a downstream end of the pretensioner tube to create a stop location for the piston to prevent operating gas from the gas generator from exiting the end of the pretensioner tube; and further including
    a guide block located in the downstream end of the pretensioner tube for directing the power transmission element into the ring gear; and wherein the guide block includes a trench disposed on an underside of the guide block, and wherein the trench is configured to engage a projection connected to the frame of the retractor.

2. The seat belt retractor of claim 1, wherein the guide block includes a flange which blocks the downstream end of the stopper tube.

3. The seat belt retractor of claim 1, wherein the guide block includes a groove for receiving a stopper pin.

4. The seat belt retractor of claim 1, wherein the projection extends from the frame of the retractor and extends through a slot in the pretensioner tube and through a slot in the stopper tube and into the guide block trench to hold and engage the stopper tube and prevent the stopper tube from moving downstream when the pretensioner device activates.

5. A seatbelt retractor for a seat belt device in a vehicle, the retractor comprising: a frame; a spool configured to be fixed to one end of a webbing so that the webbing may be wound around the spool, the spool being rotatably mounted at both ends to the frame and configured to rotate in a webbing extraction direction and a webbing retraction direction; a pretensioner device configured to rotate the spool in a webbing retraction direction when the pretensioner device activates in response to an acceleration of the vehicle greater than a predetermined high acceleration; and wherein the pretensioner device comprises a power transmission element carried in a pretensioner tube that is driven by gas provided by a gas generator when the pretensioner device is activated so that the power transmission element can contact a ring gear connected to the spool to thereby rotate the spool in the webbing retraction direction; and a stopper tube located in a downstream end of the pretensioner tube to create a stop location for a sealing element to prevent operating gas from the gas generator from exiting the end of the pretensioner tube; wherein the pretensioner device further includes a guide block located on the stopper tube for directing the power transmission element into the ring gear, and the guide block is connected to the pretensioner tube by a pin that passes through the guide block and the pretensioner tube.

6. The retractor of claim 5, wherein the guide block includes a flange that projects outwardly to block downstream movement of the stopper tube.

7. The retractor of claim 5, wherein the stopper tube includes an opening for receiving a projection of the guide block to thereby fix the position of the stopper tube relative to the guide block and the pretensioner tube.

8. A seatbelt retractor for a seat belt device in a vehicle, the retractor comprising:
   a frame;
   a spool configured to be fixed to one end of a webbing so that the webbing may be wound around the spool, the spool being rotatably mounted at both ends to the frame and configured to rotate in a webbing extraction direction and a webbing retraction direction;
   a pretensioner device configured to rotate the spool in a webbing retraction direction when the pretensioner device activates in response to an acceleration of the vehicle greater than a predetermined high acceleration; and
   wherein the pretensioner device comprises a power transmission element carried in a pretensioner tube that is driven by gas provided by a gas generator when the pretensioner device is activated so that the power transmission element can contact a ring gear connected to the spool to thereby rotate the spool in the webbing retraction direction;
   and a stopper tube located in a downstream end of the pretensioner tube to create a stop location for a sealing element to prevent operating gas from the gas generator from exiting the end of the pretensioner tube;
   wherein the stopper tube is fixed to the frame to thereby prevent downstream movement of the stopper tube relative to the pretensioner tube; and
   wherein the stopper tube includes a slot and wherein the frame includes a flange that projects through the slot to fix the position of the stopper tube relative to the frame.

9. The seat belt retractor of claim 8, further comprising a guide block located within the stopper tube and in the downstream end of the pretensioner tube for directing the power transmission element into the ring gear; and wherein the guide block is fixed in position relative to the pretensioner tube.

* * * * *